US008689504B2

(12) United States Patent
Monden et al.

(10) Patent No.: US 8,689,504 B2
(45) Date of Patent: Apr. 8, 2014

(54) FIRE PROTECTION MODULE

(75) Inventors: Thomas Monden, Stetten (DE); Ulf Mordau, Waal (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/327,251

(22) Filed: Dec. 15, 2011

(65) Prior Publication Data

US 2012/0233943 A1  Sep. 20, 2012

(30) Foreign Application Priority Data

Dec. 15, 2010  (DE) .................. 10 2010 063 096

(51) Int. Cl.
  *E04C 2/52* (2006.01)
  *F16L 5/04* (2006.01)
(52) U.S. Cl.
  CPC ....................................... *F16L 5/04* (2013.01)
  USPC ....................................................... 52/220.8
(58) Field of Classification Search
  USPC ............ 52/232, 220.8, 219, 317, 220.1, 292, 52/473, 577, 98, 100
  See application file for complete search history.

(56) References Cited

U.S. PATENT DOCUMENTS

| 3,834,577 | A | * | 9/1974 | Tempero ....................... 312/401 |
| 4,748,787 | A | * | 6/1988 | Harbeke ...................... 52/741.3 |
| 4,848,043 | A | | 7/1989 | Harbeke |
| 5,035,097 | A | * | 7/1991 | Cornwall ..................... 52/220.8 |
| 5,953,872 | A | * | 9/1999 | MacMillian et al. ......... 52/220.8 |
| 7,080,486 | B2 | * | 7/2006 | Radke et al. ..................... 52/98 |
| 2003/0009961 | A1 | | 1/2003 | Radke |
| 2004/0149390 | A1 | * | 8/2004 | Monden et al. ............... 156/391 |
| 2008/0078841 | A1 | | 4/2008 | Messmer |
| 2008/0088128 | A1 | * | 4/2008 | Staskal ......................... 285/230 |

FOREIGN PATENT DOCUMENTS

DE  9011951 U1  10/1990
EP  2096346 A2  9/2009

OTHER PUBLICATIONS

European Search Report, EP 11 18 9358, mailed Mar. 14, 2012.

* cited by examiner

*Primary Examiner* — William Gilbert
*Assistant Examiner* — Kyle Walraed-Sullivan
(74) *Attorney, Agent, or Firm* — McAndrews, Held & Malloy, Ltd.

(57) ABSTRACT

A fire protection module is provided for wall and ceiling openings. The fire protection module includes a sheath for insertion into the wall or ceiling opening and a flange to be placed at the wall or ceiling. The assembly of the fire protection module may be performed with few steps. For example, the sheath and the flange are embodied in one piece.

13 Claims, 3 Drawing Sheets

FIRE PROTECTION MODULE

RELATED APPLICATIONS

The present application claims priority to German Patent Application DE 10 2010 063 096.9, filed Dec. 15, 2010 and entitled "Brandschutzmodul" ("Fire Protection Module"), the entire content of which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Aspects of the present invention relate to a fire protection module for wall and/or ceiling openings and a method for fastening a fire protection module at a wall or ceiling.

In the construction industry it is required to integrate or provide a wall or ceiling opening in a wall or a ceiling or to guide pipelines through said wall or ceiling opening. Here, flammable or potentially melting pipelines are guided through the wall and ceiling openings, so that in case of a fire due to the burning or melting of the pipelines, openings develop, through which the fire can further spread through the building. For this reason it is known to arrange fire protection modules with an intumescent material at such wall and ceiling openings with flammable pipelines guided through them. The intumescent material increases the volume, i.e., expands in case of a fire under the effects of heat and thus seals the opening developing due to the melting or flammable pipe. Additionally, cold smoke and water tightness is required.

When guiding non-flammable pipes and/or pipelines through a wall and ceiling opening in a structure or a building it is only required to plug an existing gap, particularly an annular gap, between the pipes with mineral wool and to seal a fire protection module at both sides with a sealant against smoke and water. Here, fire protection modules may also be used as ceiling or wall penetrations without intumescent material.

DE 90 11 951 U1 shows a fire protection element for ceiling penetrations. A fire protection plate is held at one flange of an angular sheet metal by way of a bend and, at a free flange, penetrations are embodied to accept fastening elements.

BRIEF SUMMARY OF THE INVENTION

An objective of aspects of the present invention include providing a fire protection module and a method for fastening a fire protection module in which the assembly of the fire protection module can be performed easily with few steps.

Such an objective may be attained in a fire protection module including a sheath to be inserted into the wall or ceiling opening and a flange to contact the wall or ceiling, with the sheath and the flange being embodied in one piece. Preferably the sheath and the flange are made monolithically from plastic, for example, in a joint injection-molding process.

Due to the one-part and/or one-piece embodiment of the sheath and the flange, the fire protection module can advantageously be produced easily and cost-effectively, and, furthermore, the assembly of the fire protection module at the wall or ceiling opening of a building can be performed easily. Expensive assembly steps for a separate mounting or arrangement first of the sheath and then the flange are therefore no longer necessary. The sheath and the flange can either be produced as separate parts and subsequently connected to each other during production in a permanent fashion, or the sheath and the flange are already during production, e.g., initial forming, produced as a single part without requiring a connection in another production step. This way, it is not required during the assembly of the fire protection module to connect the sheath and the flange to each other at the construction site.

In particular embodiments, the sheath is embodied with a profile with a cross section completely surrounding the wall or ceiling opening. The sheath embodied as a pipe and/or pipe socket with an arbitrary cross-sectional shape completely surrounds the wall and ceiling opening in the area of the wall or ceiling such that inside a tubular space enclosed by the sheath no direct connection exists between the tubular space at the wall or ceiling opening and the wall or ceiling.

In further embodiments the sheath is connected to the flange in a permanent fashion and/or by a substance-to-substance bond and/or form-fittingly and/or force-fittingly, e.g., by a welded, glued, or riveted connection.

In an additional embodiment, the flange comprises a tubular socket and a support part. The support part serves to act as a boundary during the insertion of the fire protection module into the wall or ceiling opening in order to render it impossible after the placement of the support part at the wall or ceiling to further insert the fire protection module into the wall or ceiling opening. Here, the support part, perpendicular in reference to an axis of the sheath and/or the wall or ceiling opening, shows a greater extension than the size of the wall or ceiling opening.

Preferably the pipe socket is connected to the sheath and/or the cross-sectional form of the pipe socket is essentially equivalent to the cross-sectional shape of the sheath and/or the support part is embodied as a support ring and/or a level stretched by the support part is essentially aligned perpendicular in reference to an axis of the sheath and/or the tubular socket. In addition to the embodiment as a support ring, the support part may also be preferably embodied as a support plate, with the support ring as well as the support plate comprising an opening essentially equivalent to the geometry of the opening of the sheath and/or the pipe socket.

In additional variants the sheath and/or the pipe socket are embodied with a circular or rectangular cross section, particularly a square cross-section.

Beneficially, inside the tubular space enclosed by the sheath and/or the pipe socket an interior intumescent material is provided, particularly in an accepting chamber, e.g., an annular groove, in order to seal the tubular space enclosed by the sheath and/or the pipe socket in case of a fire.

In another embodiment, exterior intumescent material is arranged outside the sheath and/or the pipe socket in order to seal a space, particularly an annular space between the sheath and/or the pipe socket and the wall or ceiling in case of a fire.

In particular, a rubber membrane is arranged inside the tubular space to seal a pipe arranged in the tubular space. The rubber membrane is here preferably embodied as a rubber ring with a rubber opening, with the rubber opening being slightly smaller in size than a pipeline, which shall be sealed by said rubber membrane.

In another embodiment, a sealing element, particularly a sealing ring, is arranged at the flange to seal the fire protection module in reference to the wall or ceiling and/or the fire protection module comprises an assembly plate and the assembly plate serves to fasten the fire protection module at the wall or ceiling, e.g., with at least one screw.

In another embodiment, the fire protection module comprises an additional pipe socket, which can be fastened at the end of the flange facing away from the sheath, particularly by way of screwing. Preferably the additional pipe socket can be screwed into the flange.

In another embodiment, the sheath and/or the flange and/or the assembly plate and/or the additional pipe socket are made at least partially, preferably entirely, from metal, e.g., steel or aluminum.

An objective of aspects of the present invention may be further attained in a method for fastening a fire protection module with a sheath and a flange at a wall or a ceiling of a structure with the steps: preferably integrating a wall or ceiling opening in the wall or ceiling, inserting the fire protection module into the wall or ceiling opening, placing a support part of the flange to the wall or ceiling, fastening the fire protection module at the wall or ceiling, and adjusting the length of the fire protection module. The length of the fire protection module is adjusted by fastening an additional pipe socket at an end of the flange facing away from the sheath, preferably with screws. It is particularly preferred for the additional pipe socket to be screwed into the flange.

In additional embodiments, the fire protection module is embodied as a fire protection module as described elsewhere in this application.

In another embodiment, the fire protection module is fastened with an assembly plate and at least one screw at the wall or ceiling, and/or the fire protection module is fastened with glue at the wall or ceiling and preferably also sealed and/or the fire protection module is sealed with a sealing element, particularly a sealing ring, between the wall or ceiling and the flange by arranging the sealing element between the flange and the wall or ceiling, preferably with the sealing element being elastically prestressed.

In particular embodiments, an interior intumescent material is arranged inside a tubular space enclosed by the sheath and/or the pipe socket in order to seal the tubular space enclosed by the sheath and/or the pipe socket in case of a fire, and/or outside the sheath and/or outside the pipe socket an exterior intumescent material is arranged in order to seal the space between the sheath and/or the pipe socket and the wall or the ceiling in case of a fire.

BRIEF DESCRIPTION OF THE DRAWINGS

In the following, an exemplary embodiment of the invention is described in greater detail with reference to the attached drawings.

DETAILED DESCRIPTION OF THE INVENTION

Figure 1:
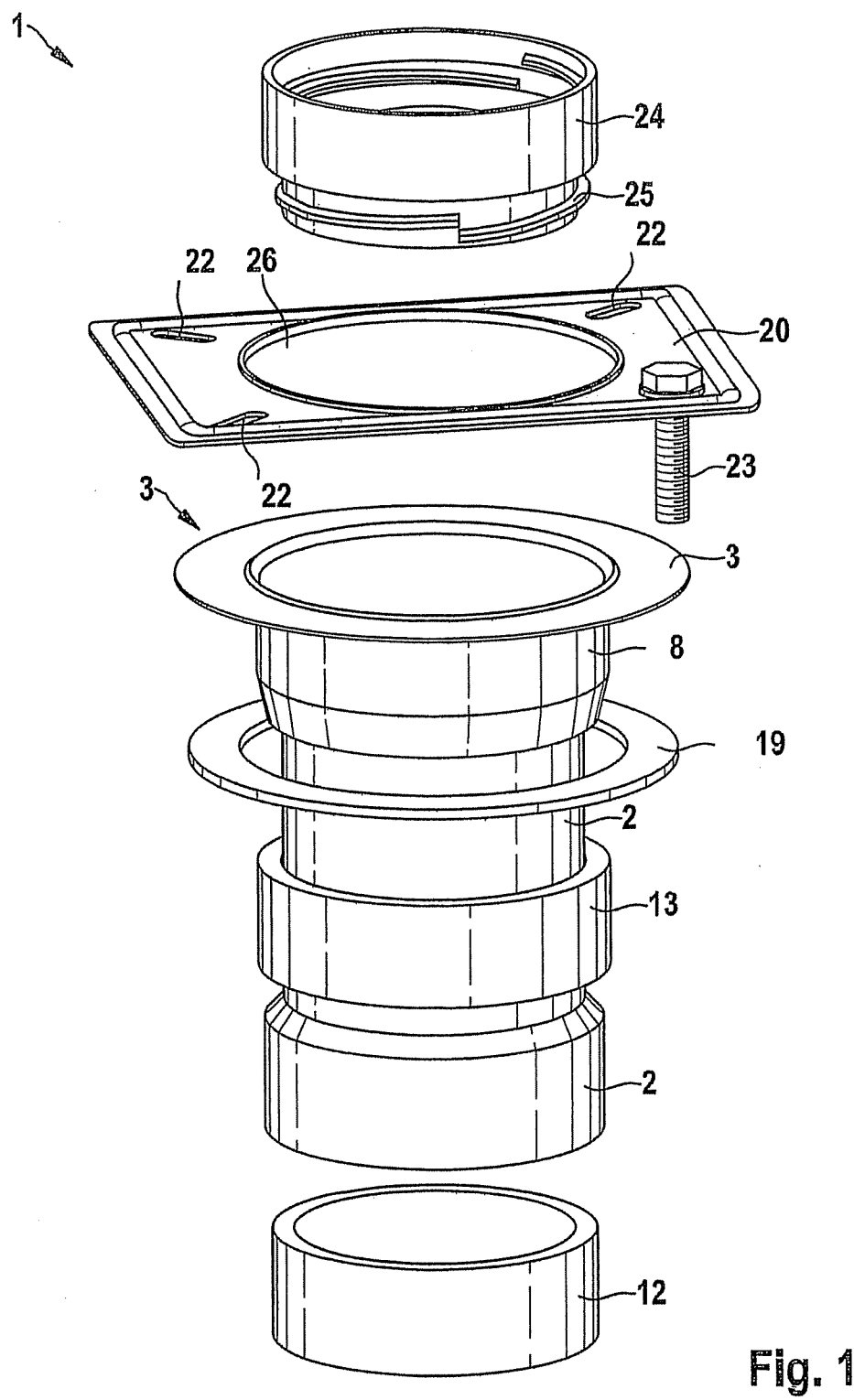
FIG. 1 shows an exploded illustration of a fire protection module formed in accordance with an embodiment of the present invention.

FIG. 1 shows an exploded illustration of a fire protection module 1. The fire protection module 1 serves in buildings or structures to reliably seal a wall opening 6 or a ceiling opening 7 (see FIG. 2), through which a flammable or non-flammable pipe and/or pipeline (not shown) is guided, particularly in case of a fire. This way, in case of a fire the spreading of the fire and/or the flames shall be hindered or prevented.

Figure 2:
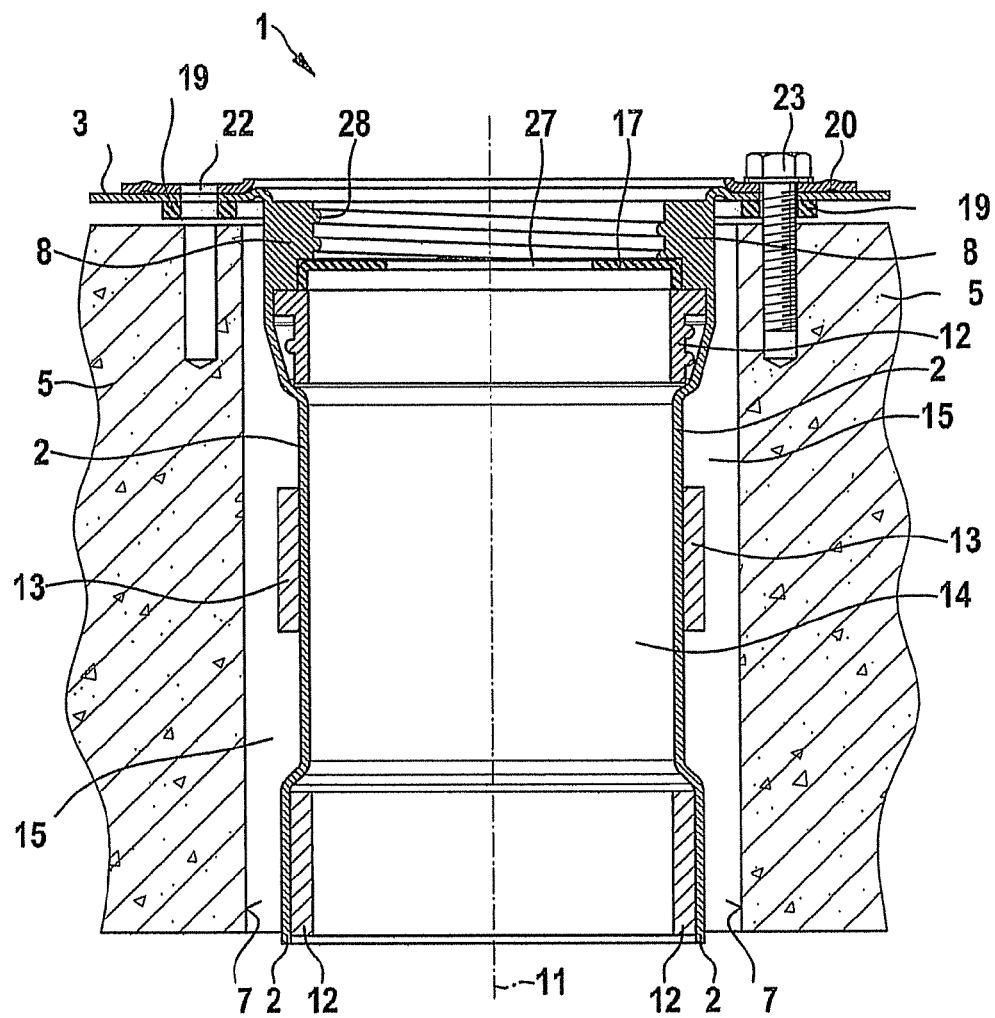
FIG. 2 shows a cross section of the fire protection module according to FIG. 1 fastened at a building without any additional pipe socket.

The fire protection module 1 comprises a sheath 2 and a flange 3 made from metal, e.g., steel. The flange 3 comprises here a support part 9 embodied as a support ring 10 and a pipe socket 8. A level spanned by the support part 9 is positioned here essentially perpendicularly in reference to an axis 11 of the sheath 2 and/or the pipe socket 8, i.e. is aligned essentially perpendicularly in reference to the axis 11 with a deviation of, for example, less than about 15°, 10°, or 5°. The sheath 2 and the pipe socket 8 form a pipe space 14 as shown in FIG. 2. An interior intumescent material 12, for example, swell graphite, is arranged inside the pipe space 14. Beginning at a temperature of approximately 200° C. the intumescent material 12 is activated and its volume enlarges. Swell graphite, for example, may enlarge by a factor of 30. In the arrangement of the fire protection module 1 in the wall opening 6 or the ceiling opening 7 at a wall 4 or a ceiling 5 of a structure (FIG. 2) a space 15 forms between the wall 4 and/or the ceiling 5 and the sheath 2 as well as the pipe socket 8 of the flange 3, which in its geometry is equivalent to an annular space 16. At the outside of the sheath 2 or the pipe socket 8 exterior intumescent material 13 is arranged.

Figure 3:
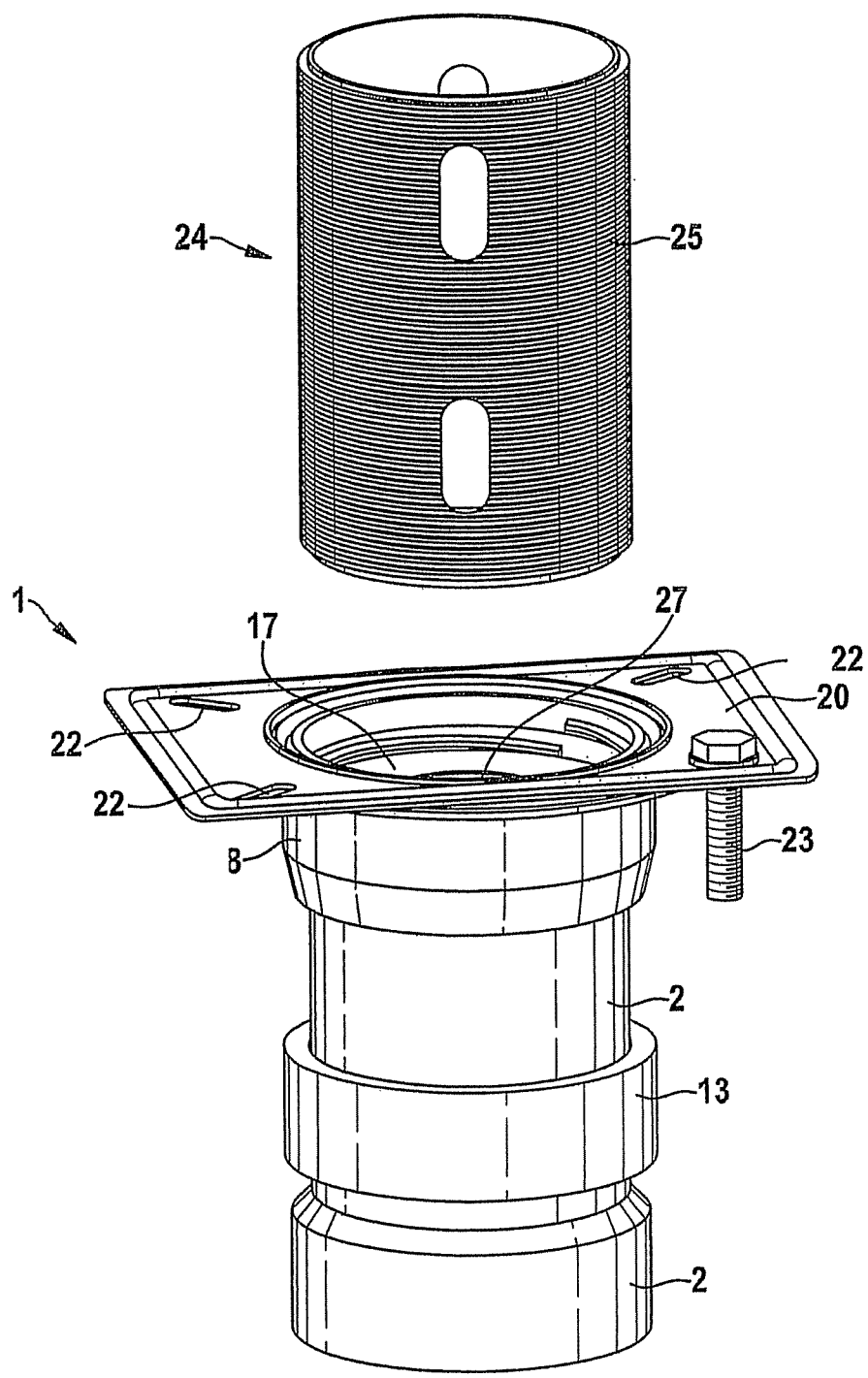
FIG. 3 shows a perspective view of a fire protection module with an additional pipe socket according to a second exemplary embodiment.

Furthermore a rubber membrane 17 is arranged at the pipe socket 8 of the flange 3 (FIGS. 2 and 3). Here, the rubber membrane 17 comprises a membrane opening 27 and the size of the membrane opening 27 is slightly smaller here than the diameter of a pipe and/or a pipeline, not shown, made from a flammable material, which is guided through the pipe space 14 and the membrane opening 27. This way, using a rubber membrane 17 on the one side, the pipe and/or the pipeline can be fastened inside the tubular space 14 and additionally a sealing is ensured via the rubber membrane 17 when there is no fire. In case of a fire, the interior intumescent material 12 expands or enlarges in its volume such that this way the tubular space 14 is entirely sealed, even in case of a melting or burning pipe inside the tubular space 14, which is replaced by the interior intumescent material 12. The exterior intumescent material 13 is also activated at a temperature of approximately 200° C. and enlarges its volume so that this way in case of a fire it seals the annular chamber 16 between the sheath 2 and/or the pipe socket 8 and the wall 4 or the ceiling 5. This way, in case of a fire a complete and reliable sealing of the wall opening 6 or the ceiling opening 7 is ensured.

Prior to inserting the fire protection module 1 into the wall opening 6 or the ceiling opening 7, a sealing element 18 may be placed onto the support ring 10, namely a sealing ring 19, so that after the insertion and placement, i.e., indirect placement of the support ring 10 at the wall 4 or the ceiling 5, the sealing ring 19 is arranged as a gasket between the support ring 10 and the wall 4 or the ceiling 5. When there is no fire the annular chamber 16 is sealed with the help of the sealing ring 19 between the wall 4 or the ceiling 5 and the pipe socket 8 and/or the sheath 2. This way, even in case a pipe, not shown, is guided through the tubular space 14, the wall opening 6 or the ceiling opening 7 is reliably sealed against water and smoke.

The mechanical fastening of the fire protection module 1 occurs in the exemplary embodiment shown in FIGS. 1 through 3 with the help of an assembly plate 20. Here the assembly plate 20 comprises four bores 21 embodied as oblong holes 22, in which screws 23 are arranged respectively. With the help of the screws 23 as well as preferably dowels and appropriate bore holes in the wall 4 or the ceiling 5 (not shown), the wall protection module 1 is fastened at the wall opening 6 or the ceiling opening 7. Here, the assembly plate 20 contacts the support ring 10 and the diameter or the size of an assembly plate opening 26 is essentially equivalent to the diameter or the size of the opening at the pipe socket 8. The assembly plate opening 26 is aligned here to the opening at the pipe socket 8 such that this way the fire protection module 1 is fastened at the wall 4 or the ceiling 5 (FIG. 2).

Deviating therefrom, in another exemplary embodiment, not shown, the fire protection module 1 can be fastened with the help of an adhesive, particularly a two-component adhesive, at the wall 4 or the ceiling 5 without the assembly plate 20 in a substance-to-substance manner. The adhesive is arranged here between the wall 4 or the ceiling 5 and the sheath 2 and/or the pipe socket 8 and/or the support ring 10.

In some applications it may be necessary or desirable to additionally arrange an additional pipe socket 24 (see, e.g., FIGS. 1 and 3) at the assembly plate opening 26 or at the end of the flange 3. When the fire protection module 1 is arranged, for example, at a ceiling opening 7 after the concrete ceiling 5 is finished on site, it is required that no water or screed seeps into the assembly plate opening 26 and the subsequent tubular space 14 when the screed is applied. For this purpose, the additional pipe socket 24 is provided with an external thread 25, and with the external thread 25 and a counter thread 28 at the flange 3, the additional pipe socket 24 can be fastened by the external thread 25 engaging the counter thread 28. In the second exemplary embodiment with the additional pipe socket 24 shown in FIG. 3, the additional pipe socket 24 shows a greater extension in the direction of the axis 11 as well as a greater extension of the external thread 25 in the direction of the axis 11. Here, the additional pipe socket 24 may be screwed to the flange 3, in the second exemplary embodiment according to FIG. 3 with different lengths, so that different lengths of the additional pipe socket 24 outside or above the assembly plate 20 are provided (not shown) according to the illustration in FIG. 3. This way, the required length of the additional pipe socket 24, which is arranged above the assembly plate 20 and/or outside the flange 3, can be adjusted to various applications.

The components of the fire protection module 1, namely the sheath 2, the flange 3, the assembly plate 20, and/or the additional pipe socket 24 are preferably produced from metal, e.g., steel or aluminum. Deviating therefrom the components of the fire protection module 1 may also be made from ceramics.

Overall, considerable advantages are provided by the fire protection module 1 according to aspects of the present invention. For example, the sheath 2 and the flange 3 are embodied in one piece, so that on the one hand the fire protection module 1 is cost-effective in its production and, on the other hand, it is not necessary to connect these two parts, namely the sheath 2 and the flange 3, expensively for assembly at the construction site during the mounting of the fire protection module 1 at the wall opening 6 or the ceiling opening 7.

The invention claimed is:

1. A fire protection module for a wall or ceiling openings, the fire protection module comprising:
    a sheath configured to be inserted into the wall or ceiling opening;
    a flange configured to contact the wall or ceiling,
    wherein the sheath and the flange are embodied in one piece,
    wherein the flange comprises a pipe socket and a support part;
    an interior intumescent material enclosed inside a tubular space surrounded by at least one of the sheath and the pipe socket, in order in case of a fire to seal the tubular space enclosed by at least one of the sheath and the pipe socket; and
    an exterior intumescent material arranged on an exterior surface of at least one of the sheath and the pipe socket, wherein said exterior intumescent material is outwardly expandable to seal a space between at least one of the sheath and the pipe socket and the wall or ceiling.

2. A fire protection module according to claim 1, wherein the sheath comprises a profile having a cross section entirely surrounding the wall or ceiling opening into which the sheath is configured to be inserted.

3. A fire protection module according to claim 1, wherein the sheath is connected to the flange by at least one of permanently, by a substance-to-substance interaction, by a form fit, or by a forced fit.

4. A fire protection module according to claim 1, wherein the pipe socket of the flange is connected to the sheath.

5. A fire protection module according to claim 1, wherein the cross-sectional form of the pipe socket is essentially equivalent to the cross-sectional form of the sheath.

6. A fire protection module according to claim 1, wherein the support part is embodied as a support ring.

7. A fire protection module according to claim 1, wherein a level spanned by the support part is essentially aligned perpendicular in reference to an axis of at least one of the sheath and the pipe socket.

8. A fire protection module according to claim 1, wherein at least one of the sheath and the pipe socket are embodied with one of an annular or rectangular cross section.

9. A fire protection module according to claim 1, further including a second interior intumescent material enclosed inside a tubular space surrounded by at least one of the sheath and the pipe socket, in order in case of a fire to seal the tubular space enclosed by at least one of the sheath and the pipe socket.

10. A fire protection module according to claim 1, wherein a rubber membrane is arranged inside a tubular space surrounded by at least one of the sheath and the pipe socket to seal a pipe arranged in the tubular space.

11. A fire protection module according to claim 1, wherein a sealing element is arranged at the flange to seal the fire protection module in reference to the wall or ceiling.

12. A fire protection module according to claim 1, wherein the fire protection module comprises an assembly plate, and the assembly plate serves to fasten the fire protection module at the wall or ceiling with at least one screw.

13. A fire protection module according to claim 1, wherein the fire protection module comprises an additional pipe socket that can be fastened at an end of the flange facing away from the sheath.

* * * * *